(12) United States Patent
Martin et al.

(10) Patent No.: US 8,377,554 B2
(45) Date of Patent: Feb. 19, 2013

(54) ELASTIC FIBER CONTAINING AN ANTI-TACK ADDITIVE

(75) Inventors: Kenneth Edward Martin, Newark, DE (US); Ronald D. Bing-Wo, Waynesboro, VA (US); Robert L. Lock, Waynesboro, VA (US)

(73) Assignee: INVISTA North America S.ár.l., Wilmington, DE (US)

( * ) Notice: Subject to any disclaimer, the term of this patent is extended or adjusted under 35 U.S.C. 154(b) by 448 days.

(21) Appl. No.: 12/726,006

(22) Filed: Mar. 17, 2010

(65) Prior Publication Data

US 2010/0312205 A1    Dec. 9, 2010

Related U.S. Application Data

(60) Provisional application No. 61/249,440, filed on Oct. 7, 2009, provisional application No. 61/162,835, filed on Mar. 24, 2009, provisional application No. 61/162,480, filed on Mar. 23, 2009.

(51) Int. Cl.
*D02G 3/00* (2006.01)
*D03D 15/08* (2006.01)

(52) U.S. Cl. ........ 428/364; 428/365; 442/182; 442/183; 442/184; 442/306; 442/328; 442/329

(58) Field of Classification Search .................. 442/182, 442/183, 184, 306, 328, 329; 428/364, 365
See application file for complete search history.

(56) References Cited

U.S. PATENT DOCUMENTS

| | | | |
|---|---|---|---|
| 4,296,174 A | 10/1981 | Hanzel et al. | |
| 5,626,960 A | 5/1997 | Carney | |
| 6,203,901 B1 * | 3/2001 | Kosinski et al. | 428/364 |
| 6,232,374 B1 * | 5/2001 | Liu et al. | 524/210 |
| 2007/0129524 A1 | 6/2007 | Sunkara | |

FOREIGN PATENT DOCUMENTS

| | | |
|---|---|---|
| KR | 10-0555131 | 2/2006 |
| KR | 10-0660266 | 12/2006 |
| WO | 98/33962 | 8/1998 |

* cited by examiner

*Primary Examiner* — Andrew Piziali
(74) *Attorney, Agent, or Firm* — Christina W. Geerlof

(57) ABSTRACT

Anti-tack additives for elastic fibers and methods of preparing the same are included. The elastic fibers include a substituted cellulose additive.

27 Claims, 5 Drawing Sheets

ELASTIC FIBER CONTAINING AN ANTI-TACK ADDITIVE

CROSS-REFERENCE TO RELATED APPLICATION

This application claims benefit of priority from U.S. Provisional Application No. 61/249,440 filed Oct. 7, 2009 which claims benefit of priority from U.S. Provisional Application No. 61/162,835 filed Mar. 24, 2009 which claims benefit of priority from U.S. Provisional Application No. 61/162,480 filed Mar. 23, 2009.

FIELD OF THE INVENTION

The present invention relates to a spandex fiber including an additive composition that reduces fiber tack.

BACKGROUND

Spandex is known to display increased tackiness as compared to conventional, inelastic fibers. Because of their increased tackiness, spandex filaments may cohere to each other or alternatively adhere to various surfaces. High tackiness becomes especially problematic in packaging where spandex filament is wound around a core. The close proximity of the fibers plus the pressure on the fibers, especially near the core, may cause adjacent pieces of filament to cohere to each other, leaving the effected filament unusable since the fibers can be difficult to remove from the wound package without breaking. Unusable filament commonly occurs at the core and is referred to as "core waste". After packaging, filament tackiness may increase during storage depending on time and temperature. Longer storage time and higher temperatures equate to increased tackiness and more core waste than freshly spun and packaged spandex. Accordingly, a reduction in spandex tackiness would reduce core waste and increase cost effectiveness.

SUMMARY

Briefly described, embodiments of this disclosure include an elastic fiber containing an anti-tack agent incorporated into the fiber, methods of preparing the fiber, methods of using this fiber, laminates including the fiber, fabrics including the fiber, garments, textiles including the fiber, and the like.

One exemplary elastic fiber, among others, includes: polyurethane or polyurethaneurea and about 0.5% to 25% by weight of a soluble anti-tack composition. In an embodiment, the soluble anti-tack composition includes cellulose butyrate, an acetyl cellulose selected from the group consisting of cellulose acetate butyrate, cellulose acetate propionate, and mixtures thereof. In an embodiment, the elastic fiber further comprising at least one additional additive selected from the group consisting of calcium stearate, magnesium stearate, organic stearates, silicon oil, mineral oil, and mixtures thereof. In addition, an embodiment of the present disclosure includes a fabric including an elastic fiber as described herein. In addition, an embodiment of the present disclosure includes a laminate including an elastic fiber as described herein. In addition, an embodiment of the present disclosure includes a garment including an elastic fiber as described herein.

One exemplary process for preparing an elastic fiber, among others, includes: (a) preparing a composition including at least one polyurethane, polyurethaneurea, or a mixture thereof; (b) adding to the composition about 0.5% to 25% by weight of an anti-tack composition; (c) adding to the composition at least one additive selected from the group consisting of: calcium stearate, magnesium stearate, organic stearate, silicon oil, mineral oil, and mixtures thereof; and (d) preparing fiber from the composition by a spinning process selected from the group consisting of: wet spinning, dry spinning and melt spinning.

DETAILED DESCRIPTION

Figure 1:
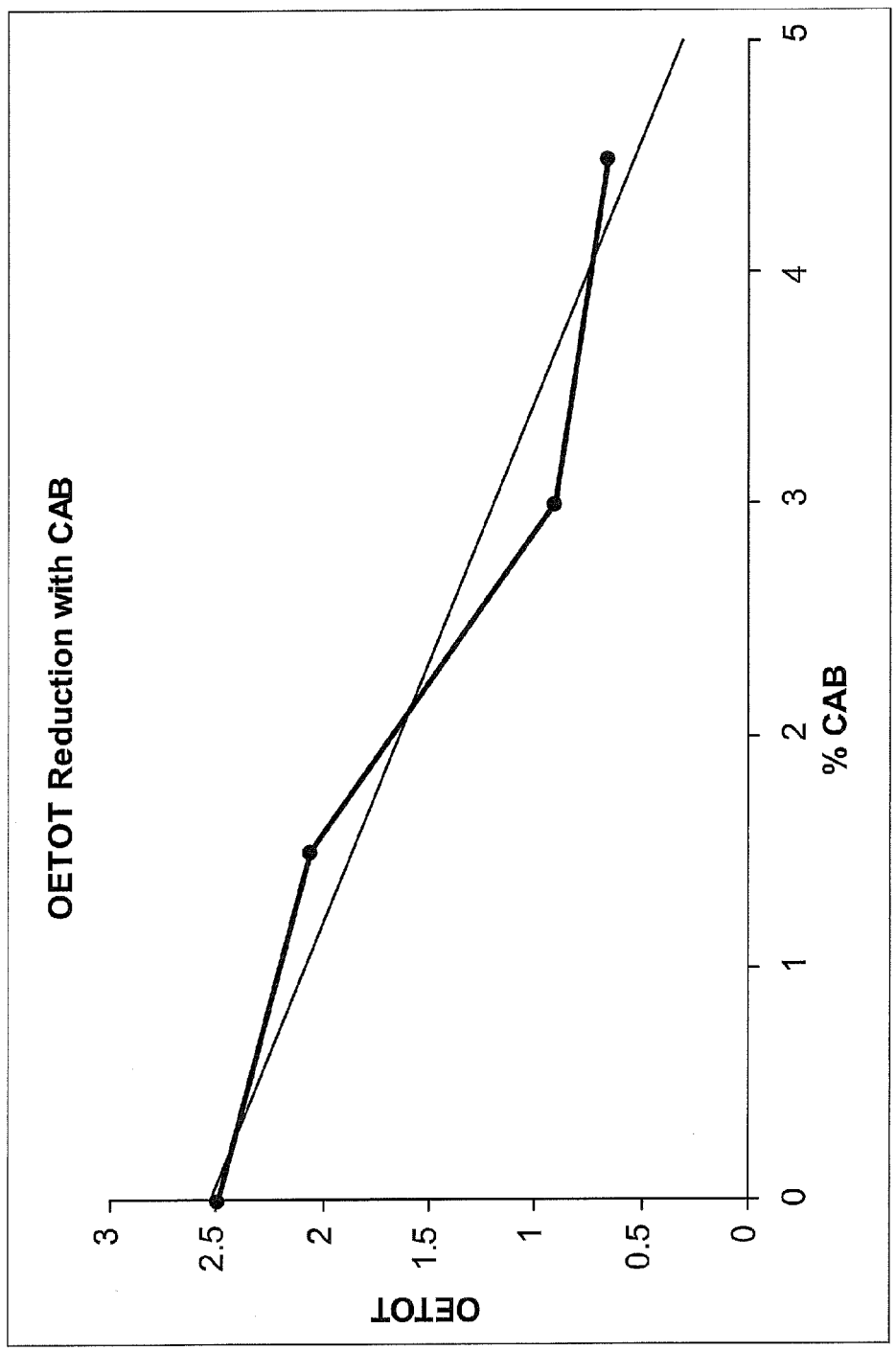
FIG. 1 demonstrates OETOT reduction with CAB.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features that may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, fabrics, textiles, and the like, which are within the skill of the art. Such techniques are fully explained in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmospheres. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DEFINITIONS

As used herein, the term "anti-tack agent" or "anti-tack additive" refers to an additive or agent used in spandex filament preparation. In an embodiment, the anti-tack agent can reduce tackiness of spandex filaments.

As used herein, the term "soluble" as applied to anti-tack agents refers to the ability of the anti-tack agent to dissolve in typical solvents used for spandex spinning, including but not limited to, dimethyl acetamide (DMAc), dimethyl formamide (DMF), and N-methylpyrrolidone (NMP).

As used herein, the term "fiber" refers to filamentous material that can be used in fabric and yarn as well as textile fabrication. One or more fibers can be used to produce a fabric or yarn. The yarn can be fully drawn or textured according to methods known in the art.

As used herein, "spandex" refers to synthetic fiber in which the fiber-forming substance is a long chain synthetic elastomer comprised of about 85% or more by weight of a segmented polyurethane, where polyurethaneureas are considered a sub-class of such polyurethanes. Such a synthetic fiber may be wound on a cylindrical core to form a supply package. Spandex compositions may be prepared by a wet-spinning or a dry-spinning process and can have any of a variety of cross-sections such as a round cross-section or a flat "tape-like" cross section. Alternatively, a polyurethane solution can be cast and dried to form a "tape" configuration.

Discussion

Embodiments of the present disclosure provide for an elastic fiber containing an anti-tack agent incorporated into the fiber, methods of preparing the fiber, methods of using this fiber, laminates including the fiber, fabrics including the fiber, garments, textiles including the fiber, and the like. Embodiments of the present disclosure provide elastic fibers that provide good delivery of the fiber from the package or core. Embodiments of the present disclosure provide smooth and even delivery of the elastic fiber, which may reduce pinching, breakage, and/or other damage of the fiber, as opposed to other elastic fibers that cause irregular delivery of the fibers.

Embodiments of the present disclosure include elastic or spandex fibers that include a soluble anti-tack composition. The anti-tack composition can include compounds that provide an anti-tack benefit to the spandex fiber such that the fiber may be used without the addition of a topical finish to the fiber. In addition, unlike most anti-tack compositions, the elastic fibers' inclusion of the anti-tack composition does not have a deleterious effect on the adhesion of the fiber or yarn, and may even provide an enhanced adhesion of the yarn to a fabric using hot melt elastic attachment adhesives. In an embodiment, the soluble anti-tack composition can include a specific cellulose acetate butyrate (CAB) and/or cellulose acetate propionate (CAP). In an embodiment, the soluble anti-tack composition can include CAB and/or CAP with an additional additive such as calcium stearate, magnesium stearate, organic stearates, silicon oil, mineral oil, and mixtures thereof. These compositions are added to the polyurethane or polyurethaneurea polymer prior to spinning of the fiber.

Although cellulose acetate butyrate and cellulose acetate propionate have been identified as providing the benefit of anti-tack without reducing gluing properties, it is recognized that other classes of materials may provide a similar benefit and can be included in the anti-tack composition of the present disclosure.

In an embodiment, the elastic fiber of the present disclosure comprises a polyurethane or polyurethaneurea and a substituted cellulose, as well as one or more additives. Acetyl cellulose can include, but is not limited to, cellulose acetate butyrate, cellulose acetate propionate, and mixtures thereof. In an embodiment, the acetyl cellulose can be cellulose acetate. Suitable additives include, but are not limited to, calcium stearate, magnesium stearate, organic stearates, mineral oil, silicon oil, and mixtures thereof. In other embodiments, the elastic fiber may or may not include a spin finish. In certain embodiments, the elastic fiber or the anti-tack composition may include at least one additional particulate anti-tack agent in addition to the compounds, (e.g., an acetyl cellulose or other substituted cellulose) noted herein.

In an embodiment, the elastic fiber of the present disclosure includes, for example, about 0.1% to 1.0%, about 0.1% to 5%, about 0.1% to 10.0%, about 0.1% to 15.0%, about 0.1% to 20%, about 0.1% to 25%, about 0.1% to 50.0%, about 0.5% to about 5.0% and about 1.0% to 5.0% substituted cellulose by weight of the fiber.

In an embodiment, the acetyl cellulose of the present disclosure is or includes cellulose acetate butyrate. The cellulose acetate butyrate may contain, for example, about 5% to 90%, about 20% to 30%, about 30% to 40%, about 40% to 50%, about 50% to 60%, about 60% to 70%, about 70% to 80%, or about 80% to 90% weight percent butyryl content. Alternatively, the composition can be a cellulose butyrate where the butyryl content is up to and including approximately 100%, which would be a cellulose butyrate.

In an embodiment, the acetyl cellulose of the present disclosure is cellulose acetate propionate. In an embodiment, the cellulose acetate propionate may contain, for example, about 5% to 90%, about 20% to 30%, about 30% to 40%, about 40% to 50%, about 50% to 60%, about 60% to 70%, about 70% to 80%, or about 80% to 90% weight percent propionyl content.

In an embodiment, the elastic fiber of the present disclosure includes an additive. In an embodiment, the additive may contain about 0.1% to 1.0%, about 0.1% to 2.0%, about 0.1% to 3.0%, about 0.1% to 4.0%, about 0.1% to 5.0%, about 0.1% to 6.0%, about 0.1% to 7.0%, about 0.1% to 8.0%, about 0.1% to 9.0%, or about 0.1% to 10.0% of an additive (e.g., a stearate, a silicon oil or a mineral oil).

In an embodiment, the viscosity of the silicon oil or mineral oil may be, for example, from about 1 centistoke to 200 centistokes, about 5 centistokes to 150 centistokes, about 10 centistokes to 100 centistokes, or about 20 centistokes to 50 centistokes.

In an embodiment, the elastic fiber of the present disclosure comprises a polyurethane or polyurethaneurea and about 0.5% to 25% by weight of cellulose acetate butyrate, with about 35% to 57% by weight butyryl content, or about 50% to 57% by weight butyryl content. Embodiments of the elastic fiber may contain a further additive, such as calcium stearate, magnesium stearate, organic stearate, silicon oil, mineral oil, and mixtures thereof. In certain embodiments, the elastic fiber excludes a spin finish. The elastic fiber of the present disclosure may include a spin finish which includes about 0.5% to 7.0% of a topically applied mineral oil or silicon oil or mixtures containing mineral oil or silicon oil by weight of the final fiber (i.e., weight once applied).

Embodiments of the present disclosure include a process for preparing any one of the elastic fiber as described herein. The process comprises preparing a composition including at least a polyurethane, a polyurethaneurea, or mixtures thereof. Next, the process includes adding an additive to the composition (e.g., calcium stearate, magnesium stearate, organic stearate, silicon oil, mineral oil, or mixtures thereof). Subsequently, the process includes adding a substituted cellulose to the composition. Next, the process includes preparing a fiber from the composition by a spinning process (e.g., wet spinning, dry spinning, and melt spinning).

In an embodiment, the process comprises preparing a composition containing at least one polyurethane or polyurethaneurea, or mixtures thereof, adding an additive to the composition selected from calcium stearate, magnesium stearate, organic stearate, silicon oil, mineral oil, and mixtures thereof, adding about 0.5% to 25% of cellulose acetate butyrate to the composition, and preparing fiber from the resulting composition by a spinning process selected from wet spinning, dry spinning, and melt spinning.

In an embodiment, the process comprises preparing a composition containing at least one polyurethane or polyurethaneurea, or mixtures thereof, adding an additive to the composition selected from calcium stearate, magnesium stearate, organic stearate, silicon oil, mineral oil, and mixtures thereof, adding about 0.5% to 25% of cellulose acetate propionate to the composition, and preparing fiber from the resulting composition by a spinning process selected from wet spinning, drying spinning, and melt spinning.

In an embodiment, the polymers used to create the elastic fibers of the present disclosure may generally be prepared by capping a macromolecular glycol with, for example, a diisocyanate, then dissolving the resulting capped glycol in a suitable solvent (e.g., dimethylacetamide (DMAc), N-methylpyrrolidone, dimethylformamide, and the like), and chain-extending the capped glycol with chain extenders such as diols to form polyurethanes, or diamines to form polyurethaneureas. Polyurethaneurea compositions useful for preparing fiber or long chain synthetic polymers include at least 85% by weight of a segmented polyurethane. Typically, these include a polymeric glycol which is reacted with a diisocyanate to form an NCO-terminated prepolymer (a "capped glycol"), which is then dissolved in a suitable solvent, such as dimethylacetamide, dimethylformamide, or N-methylpyrrolidone, and secondarily reacted with a difunctional chain extender.

Polyurethanes are formed in a second step when the chain extenders are diols (and may be prepared without solvent). Polyurethaneureas, a sub-class of polyurethanes, are formed when the chain extenders are diamines. In the preparation of a polyurethaneurea polymer which can be spun into spandex, the glycols are extended by sequential reaction of the hydroxy end groups with diisocyanates and one or more diamines. In each case, the glycols must undergo chain extension to provide a polymer with the necessary properties, including viscosity. If desired, dibutyltin dilaurate, stannous octoate, mineral acids, tertiary amines such as triethylamine, N,N'-dimethylpiperazine, and the like, and other known catalysts can be used to assist in the capping step.

In an embodiment, suitable polymeric glycol components include, but are not limited to, polyether glycols, polycarbonate glycols, and polyester glycols of number average molecular weight of about 600 to 3,500. Mixtures of two or more polymeric glycol or copolymers can be included.

In an embodiment, examples of polyether glycols that can be used include, but are not limited to, those glycols with two hydroxyl groups, from ring-opening polymerization and/or copolymerization of ethylene oxide, propylene oxide, trimethylene oxide, tetrahydrofuran, and 3-methyltetrahydrofuran, or from condensation polymerization of a polyhydric alcohol, such as a diol or diol mixtures, with less than 12 carbon atoms in each molecule, such as ethylene glycol, 1,3-propanediol, 1,4-butanediol, 1,5-pentanediol 1,6-hexanediol, 2,2-dimethyl-1,3 propanediol, 3-methyl-1,5-pentanediol, 1,7-heptanediol, 1,8-octanediol, 1,9-nonanediol, 1,10-decanediol and 1,12-dodecanediol. A poly(tetramethylene ether)glycol of molecular weight of about 1,700 to about 2,100, such as Terathane® 1800 (INVISTA of Wichita, Kans.) with a functionality of 2, is an example of a specific suitable glycol. Co-polymers can include poly(tetramethylene-co-ethyleneether)glycol.

In an embodiment, examples of polyester polyols that can be used include, but are not limited to, those ester glycols with two hydroxyl groups, produced by condensation polymerization of aliphatic polycarboxylic acids and polyols, or their mixtures, of low molecular weights with no more than 12 carbon atoms in each molecule. Examples of suitable polycarboxylic acids include, but are not limited to, malonic acid, succinic acid, glutaric acid, adipic acid, pimelic acid, suberic acid, azelaic acid, sebacic acid, undecanedicarboxylic acid, and dodecanedicarboxylic acid. Examples of suitable polyols for preparing the polyester polyols include, but are not limited to, ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear bifunctional polyester polyol with a melting temperature of about 5° C. to 50° C. is an example of a specific polyester polyol.

In an embodiment, examples of polycarbonate polyols that can be used include, but are not limited to, those carbonate glycols with two or more hydroxy groups, produced by condensation polymerization of phosgene, chloroformic acid ester, dialkyl carbonate or diallyl carbonate and aliphatic polyols, or their mixtures, of low molecular weights with no more than 12 carbon atoms in each molecule. Examples of suitable polyols for preparing the polycarbonate polyols include, but are not limited to, diethylene glycol, 1,3-propanediol, 1,4-butanediol, 1,5-pentanediol, 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polycarbonate polyol with a melting temperature of about 5° C. to about 50° C. is an example of a specific polycarbonate polyol.

In an embodiment, the diisocyanate component can also include a single diisocyanate or a mixture of different diisocyanates including an isomer mixture of diphenylmethane diisocyanate (MDI) containing 4,4'-methylene bis(phenyl isocyanate) and 2,4'-methylene bis(phenyl isocyanate). Any suitable aromatic or aliphatic diisocyanate can be included. Examples of diisocyanates that can be used include, but are not limited to, 4,4'-methylene bis(phenyl isocyanate), 2,4'-methylene bis(phenyl isocyanate), 4,4'-methylenebis(cyclohexyl isocyanate), 1,3-diisocyanato-4-methyl-benzene, 2,2'-toluenediisocyanate, 2,4'-toluenediisocyanate, and mixtures thereof.

In an embodiment, a chain extender may be either water or a diamine chain extender for a polyurethaneurea. Combinations of different chain extenders may be included depending on the desired properties of the polyurethaneurea and the resulting fiber. Examples of suitable diamine chain extenders include, but are not limited to: hydrazine; 1,2-ethylenediamine; 1,4-butanediamine; 1,2-butanediamine; 1,3-butanediamine; 1,3-diamino-2,2-dimethylbutane; 1,6-hexamethylenediamine; 1,12-dodecanediamine; 1,2-propanediamine; 1,3-propanediamine; 2-methyl-1,5-pentanediamine; 1-amino-3,3,5-trimethyl-5-aminomethylcyclohexane; 2,4-diamino-1-methylcyclohexane; N-methylamino-bis(3-propylamine); 1,2-cyclohexanediamine; 1,4-cyclohexanediamine; 4,4'-methylene-bis(cyclohexylamine); isophorone diamine; 2,2-dimethyl-1,3-propanediamine; meta-tetramethylxylenediamine; 1,3-diamino-4-methylcyclohexane; 1,3-cyclohexane-diamine; 1,1-methylene-bis(4,4'-diaminohexane); 3-aminomethyl-3,5,5-trimethylcyclohexane; 1,3-pentanediamine(1,3-diaminopentane); m-xylylene diamine; and Jeffamine® (Texaco).

When a polyurethane is desired, the chain extender is a diol. Examples of such diols that may be used include, but are not limited to, ethylene glycol, 1,3-propanediol, 1,2-propylene glycol, 3-methyl-1,5-pentanediol, 2,2-dimethyl-1,3-propanediol, 2,2,4-trimethyl-1,5-pentanediol, 2-methyl-2-ethyl-1,3-propanediol, 1,4-bis(hydroxyethoxy)benzene, and 1,4-butanediol, hexanediol and mixtures thereof.

In an embodiment, a monofunctional alcohol or a primary/secondary monofunctional amine may optionally be included to control the molecular weight of the polymer. Blends of one or more monofunctional alcohols with one or more monofunctional amines may also be included. Examples of monofunctional alcohols useful with the present disclosure include, but are not limited to, at least one member selected from the group consisting of aliphatic and cycloaliphatic primary and secondary alcohols with 1 to 18 carbons, phenol, substituted phenols, ethoxylated alkyl phenols and ethoxylated fatty alcohols with molecular weight less than about 750, including molecular weight less than 500, hydroxyamines, hydroxymethyl and hydroxyethyl substituted tertiary amines, hydroxymethyl and hydroxyethyl substituted heterocyclic compounds, and combinations thereof, including furfuryl alcohol, tetrahydrofurfuryl alcohol, N-(2-hydroxyethyl)succinimide, 4-(2-hydroxyethyl)morpholine, methanol, ethanol, butanol, neopentyl alcohol, hexanol, cyclohexanol, cyclohexanemethanol, benzyl alcohol, octanol, octadecanol, N,N-diethylhydroxylamine, 2-(diethylamino)ethanol, 2-dimethylaminoethanol, and 4-piperidineethanol, and combinations thereof. Examples of suitable mono-functional dialkylamine blocking agents include, but not limited to: N,N-diethylamine, N-ethyl-N-propylamine, N,N-diisopropylamine, N-tert-butyl-N-methylamine, N-tert-butyl-N-benzylamine, N,N-dicyclohexylamine, N-ethyl-N-isopropylamine, N-tert-butyl-N-isopropylamine, N-isopropyl-N-cyclohexylamine, N-ethyl-N-cyclohexylamine, N,N-diethanolamine, and 2,2,6,6-tetramethylpiperidine.

In an embodiment, after synthesizing the polymer solution of the present disclosure, an anti-tack additive is incorporated into the solution. The solution having the anti-tack additive dispersed therein may be dry-spun to form the elastic fiber of the present disclosure. Dry-spinning refers to the process of forcing a polymer solution through spinneret orifices into a shaft to form a filament. Heated inert gas is passed through the chamber, evaporating the solvent from the filament as the filament passes through the shaft. The resulting elastic fiber may then be wound on a cylindrical core to form a spandex supply package. A wet-spinning process may also be used as well as the casting and drying of the polymer solution.

In an embodiment, the elastic fiber of the present disclosure may contain an additional, conventional additive that are added for specific purposes, such as antioxidants, thermal stabilizers, UV stabilizers, pigments and delusterants (for example titanium dioxide), dyes and dye enhancers, lubricating agents (for example silicone oil), additives to enhance resistance to chlorine degradation (for example zinc oxide; magnesium oxide and mixtures of huntite and hydromagnesite), and the like, so long as such additives do not produce antagonistic effects with the spandex elastomer or anti-tack additive of this disclosure. Some of the conventional additives, such as titanium dioxide, exhibit small effects on over-end take-off tension (OETOT) measurements, the parameter used to judge tackiness of the elastic fiber (as described below in the Examples), but none of them has an appreciable effect on the OETOT measurements and are not added to the spandex in amounts so as to reduce tackiness.

Embodiments of the present disclosure include articles of manufacture comprising the elastic fiber of the present disclosure. These articles of manufacture include, but are not limited to, a fabric and a laminate structure.

In an embodiment, the present disclosure provides a fabric comprising an elastic fiber which contains polyurethane or polyurethaneurea and about 0.5% to 25% by weight of cellulose acetate butyrate. An additional additive may be included, such as calcium stearate, magnesium stearate, organic stearate, silicon oil, mineral oil, and mixtures thereof.

In an embodiment, the laminate structure comprises an elastic fiber of the present disclosure which has a polyurethane or polyurethaneurea, about 0.5% to 25% by weight of cellulose acetate butyrate and at least one additional additive, such as calcium stearate, magnesium stearate, organic stearate, silicon oil, mineral oil, and mixtures thereof. In certain embodiments, the fiber is adhered to one or more layers of a substrate, such as a fabric, nonwoven, film, and combinations thereof. The laminate structure may be adhered by an adhesive, ultrasonic bonding, thermal bonding or combinations thereof. The laminate structure may comprise a disposable hygiene article such as diapers, training pants, adult incontinence articles, or feminine hygiene articles.

EXAMPLES

Having described the embodiments of the present disclosure, in general, the following Examples describe some additional embodiments of the present disclosure. While embodiments of present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1

Over-end take-off tension (OETOT) was determined as described in U.S. Pat. No. 4,296,174, col. 4, lines 20-45, and FIG. 6, which is incorporated herein by reference. Measurement is made of the average tensile load required to remove a 183 m length of sample of spandex yarn from a tubular supply package of the yarn at a delivery rate of 45.7 m/min. In the example below, measurements were made at the surface, center, and core of the package. For example, measurements are made after a few grams of fiber are removed to establish the intended winding pattern, i.e. "surface"; measurements are made after roughly one-half of the package is removed, i.e. "center"; and measurements are made after all but roughly 125 g of the fiber has been removed from the package, i.e. "core". OETOT is reported in grams 24 hours after oven-aging for 16 hours at 57° C., in order to simulate conditions approximating 6 months of storage.

An elastic fiber with an anti-tack additive was prepared according to the following synthetic methods. Cellulose acetate butyrate was spun into about 40 denier (44 decitex) polyurethaneurea fiber without finish on a dry spin machine. The additive significantly reduced yarn tackiness as quantified by OETOT in Table 1 below and in FIG. 1.

TABLE 1

OETOT Reduction Using Cellulose Acetate Butyrate

| %•cellulose•acetate/butyrate | OETOT•(g) |
| --- | --- |
| 0•(control) | 2.490 |
| 1.5 | 2.059 |
| 3 | 0.901 |
| 4.5 | 0.654 |

The polymer used in this example was made by capping a 1800 molecular weight polytetramethyleneether glycol with MDI at a molar ratio of 1.63. The resulting capped glycol was chain extended in DMAc solvent with a mixture of ethylene diamine and 2-methyl-1,5-pentanediamine ((90/10 mole ratio) and terminated with diethyl amine. In addition to the substituted cellulose anti tack agent, the polymer also contained: 1.4 wt. % Irgonox antioxidant available from Ciba, 0.5 wt. % Methacrol 2462B UV stabilizer available from E.I. DuPont de Nemours, 3.9% Ultracarb, a huntitte/hydromagnesite mineral mixture available from Microfine Minerals, Ltd., 0.6 wt. % silicon oil composed of 96% polydimethylsiloxane and 4 wt. % polydiamylsiloxane, and 0.3 wt. % titanium dioxide delustrant, available from E.I. Dupont de Nemours, Inc.

Example 2

Figure 2:
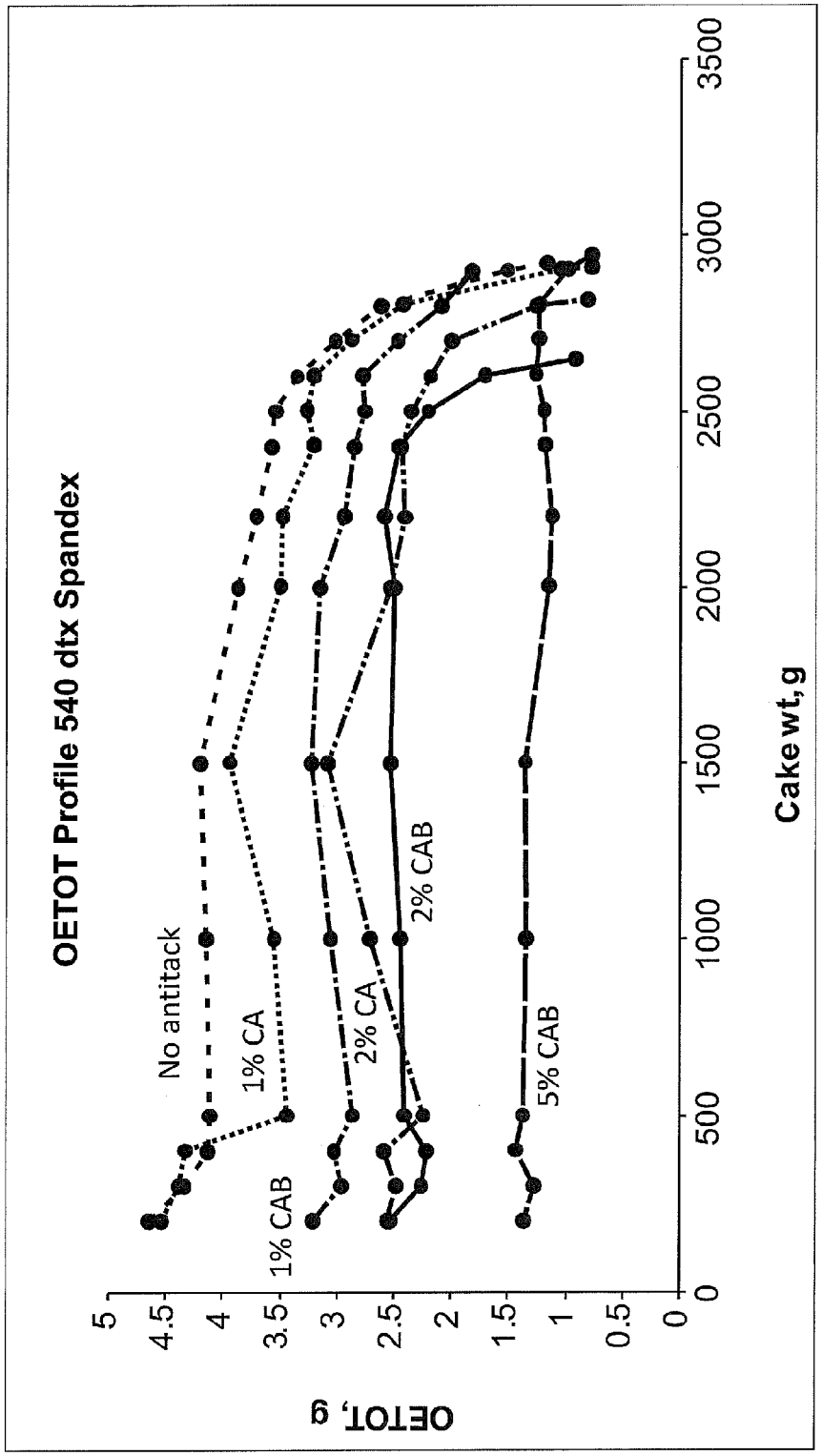
FIG. 2 is an OETOT profile for 540 dtx spandex.
Figure 3:
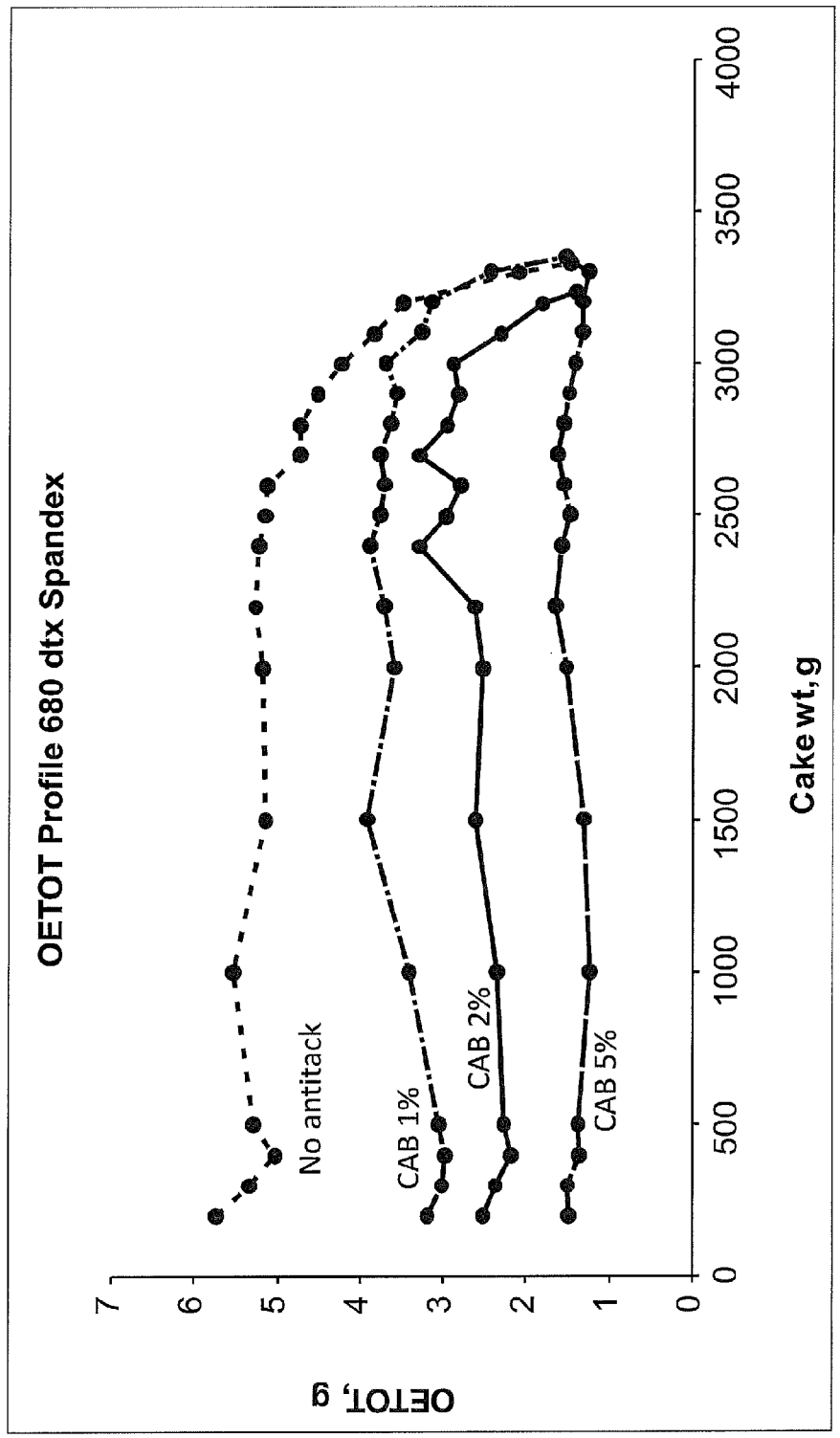
FIG. 3 is an OETOT profile for 680 dtx spandex.

The profiles in FIGS. 2 and 3 show the control of OETOT possible with the addition of cellulose acetate butyrate or cellulose acetate at varying concentrations spun into 490 and 610 denier (540 and 680 decitex) fibers without topically applied finish. Each line/profile is measured from an individual package. The outside of the package is the heavier weight (3000 grams). As the yarn is being consumed the cake weight decreases. Measurements of over end take off tension were taken at various package weights. Lighter weights are closer to the core of the package. The fibers in this example were made from the same polymer as used in Example 1.

Example 3

Figure 4:
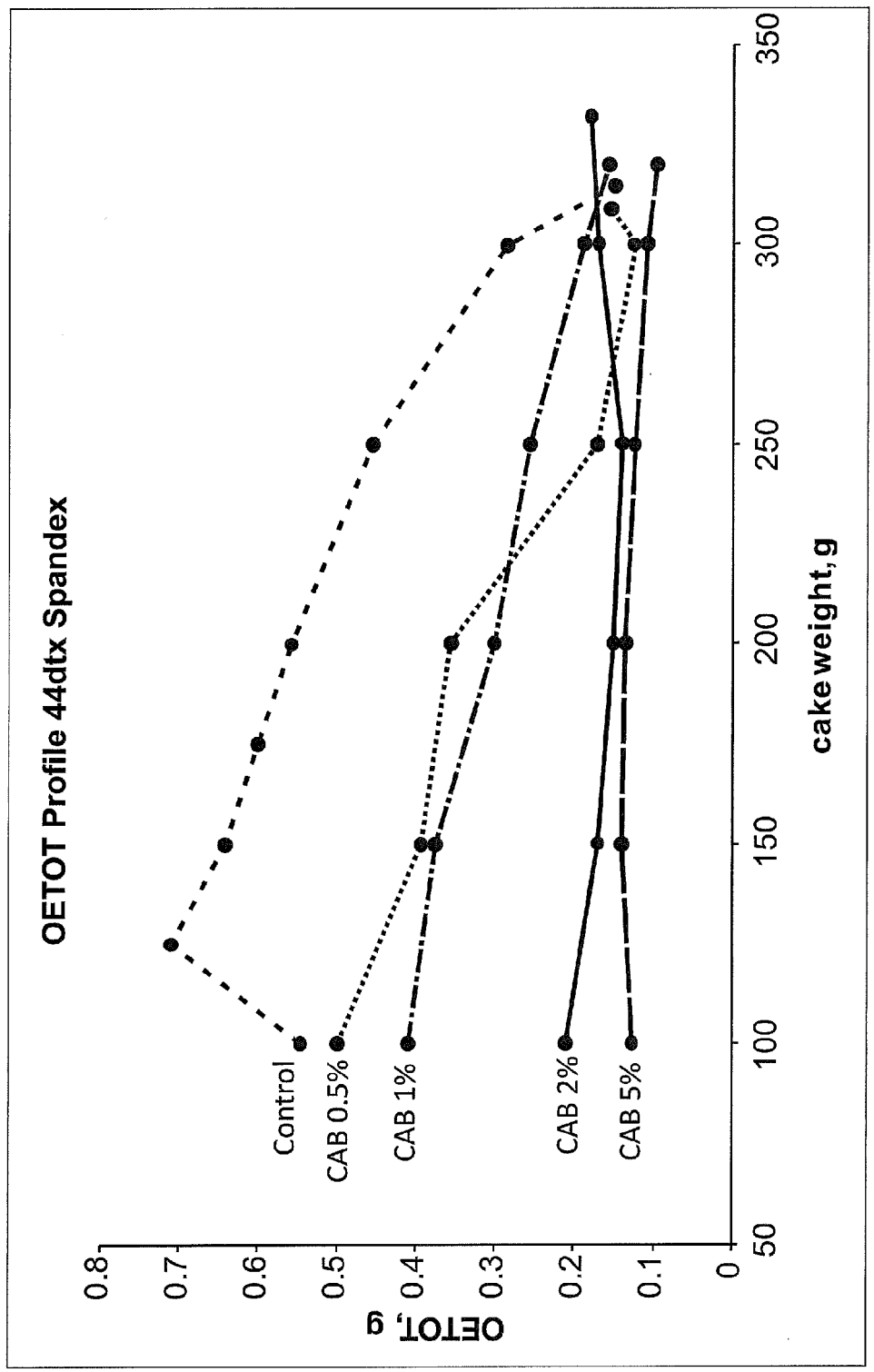
FIG. 4 is an OETOT profile for 44 dtx spandex.

FIG. 4 describes OETOT profiles for various concentrations of cellulose acetate butyrate in weight 40 denier (44 decitex) fibers with finish present. Even with the presence of finish, the OETOT was decreased with cellulose acetate butyrate added to the yarn. This example used the same polymer as used in Example 1. The topically applied finish was added to the yarn at a level of about 4 and 6 percent based on weight and was composed of a dispersion of 6 wt. % magnesium stearate in a polydimethylsiloxane silicon oil.

Example 4

Figure 5:
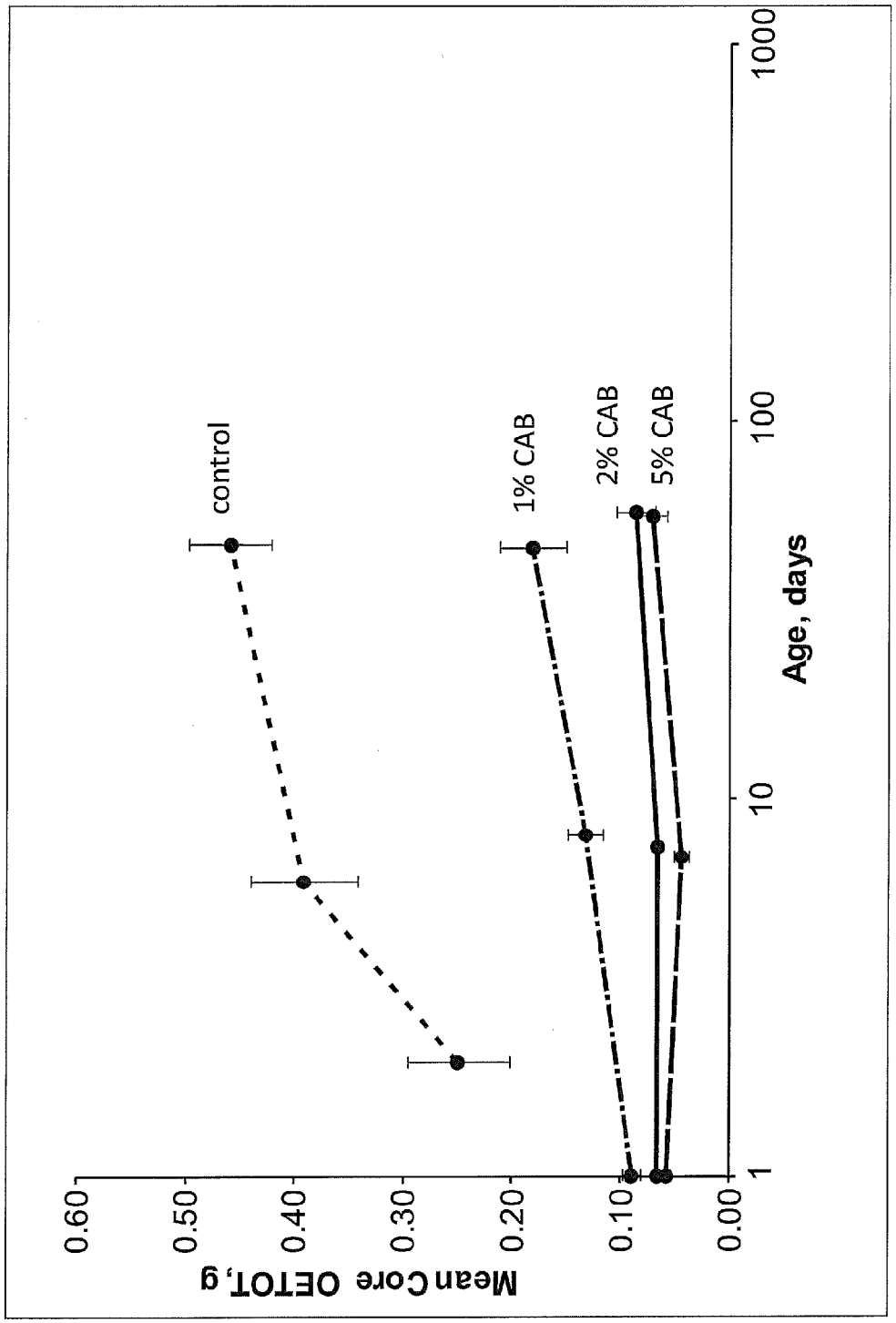
FIG. 5 demonstrates mean core OETOT over time.

FIG. 5 illustrates the OETOT relationship with time for fibers with finish present. The fibers in this example are 40 denier (44 decitex) and are made from a polymer with the composition as noted below. The polymer used in this example was made by capping a 1800 molecular weight polytetramethyleneether glycol with MDI at a capping ratio of 1.63. The resulting capped glycol was chain extended in DMAc solvent with a mixture of ethylene diamine and 2-methyl-1,5-pentanediamine ((90/10 mole ratio) and terminated with diethyl amine. In addition to the substituted cellulose anti tack agent, the polymer also contained: 1.0 wt. % Irganox 245 antioxidant available from Ciba, Inc., 0.35 wt. % Methacrol 2462B UV stabilizer from E.I. DuPont de Nemours, and 0.4 wt. % silicon oil composed of 96% polydimethylsiloxane and 4 wt. % polydiamylsiloxane. The finish used in this example was the same composition as in example 3 and applied at the same rate.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also the individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±8%, or ±10%, of the numerical value(s) being modified. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

We claim:

1. An elastic fiber comprising polyurethane or polyurethaneurea and about 0.5% to 25% by weight of a soluble anti-tack composition wherein the soluble anti-tack composition includes a substituted cellulose selected from the group consisting of: cellulose butyrate, cellulose acetate butyrate, cellulose acetate propionate, and a mixture thereof.

2. The elastic fiber of claim 1, further comprising at least one additional additive selected from the group consisting of calcium stearate, magnesium stearate, organic stearates, silicon oil, mineral oil, and mixtures thereof.

3. The elastic fiber of claim 1, wherein said substituted cellulose is present in an amount of about 0.5% to 5.0% by weight of the fiber.

4. The elastic fiber of claim 1, wherein said cellulose acetate butyrate includes from about 35% to 57% weight percent butyryl content or said cellulose acetate propionate includes about 40% to 50% weight percent propionyl content.

5. The elastic fiber of claim 1, wherein said cellulose acetate butyrate includes about 50% to 57% by weight butyryl content.

6. The elastic fiber of claim 1, wherein the fiber includes from about 0.1% to about 1% of a silicon oil or a mineral oil.

7. The elastic fiber of claim 6, wherein the silicon oil or mineral oil has a viscosity of about 5 centistokes to about 150 centistokes.

8. The elastic fiber of claim 1, further comprising at least one particulate anti-tack agent.

9. The elastic fiber of claim 1, wherein said fiber excludes a spin finish.

10. The elastic fiber of claim 1, further comprising a topically applied mineral oil or silicon oil, or blends containing mineral oil or silicon oil as a spin finish in an amount of about 0.5% to 7.0% by weight of the final fiber once applied.

11. An elastic fiber comprising polyurethane or polyurethaneurea and about 0.5 to 25% by weight of cellulose acetate butyrate, wherein said cellulose acetate butyrate includes about 35% to 57% by weight butyryl content.

12. The elastic fiber of claim 11, wherein said cellulose acetate butyrate includes about 50% to 57% by weight butyryl content.

13. The elastic fiber of claim 11, further comprising at least one additive selected from the group consisting of: calcium stearate, magnesium stearate, organic stearate, silicon oil, mineral oil, and mixtures thereof.

14. The elastic fiber of claim 11, wherein said fiber excludes a spin finish.

15. The elastic fiber of claim 11, further comprising a topically applied mineral oil or silicon oil or blends containing mineral oil or silicon oil as a spin finish in an amount of about 0.5% to 7.0% by weight of the fiber final fiber once applied.

16. A process for preparing an elastic fiber comprising:
(a) preparing a composition including at least one polyurethane, polyurethaneurea, or a mixture thereof;
(b) adding to the composition about 0.5% to 25% by weight of an anti-tack composition wherein the anti-tack composition is selected from cellulose acetate butyrate, cellulose acetate propionate, and a mixture thereof;
(c) adding to the composition at least one additive selected from the group consisting of: calcium stearate, magnesium stearate, organic stearate, silicon oil, mineral oil, and mixtures thereof; and
(d) preparing fiber from the composition by a spinning process selected from the group consisting of: wet spinning, dry spinning and melt spinning.

17. The process of claim 16, wherein said cellulose acetate butyrate includes about 35% to 57% by weight butyryl content.

18. The process of claim 16, wherein said cellulose acetate butyrate includes about 50% to 90% by weight butyryl content.

19. A fabric comprising an elastic fiber comprising polyurethane or polyurethaneurea and about 0.5% to 25% by weight of a soluble anti-tack composition wherein the soluble anti-tack composition includes a substituted cellulose selected from the group consisting of: cellulose butyrate, cellulose acetate butyrate, cellulose acetate propionate, and a mixture thereof.

20. The fabric of claim 19, further comprising at least one additional additive selected from the group consisting of calcium stearate, magnesium stearate, organic stearates, silicon oil, mineral oil, and mixtures thereof.

21. The fabric of any one of claim 19 or 20, wherein said fabric includes a knit, woven, or non-woven construction.

22. The fabric of any one of claim 19 or 20 comprising a garment.

23. A laminate structure comprising:
an elastic fiber comprising polyurethane or polyurethaneurea and about 0.5% to 25% by weight of a soluble anti-tack composition wherein the soluble anti-tack composition includes a substituted cellulose selected from the group consisting of: cellulose butyrate, cellulose acetate butyrate, cellulose acetate propionate, and a mixture thereof;
wherein said fiber is adhered to one or more layers of a substrate selected from the group consisting of: fabric, nonwoven, film, and combinations thereof.

24. The laminate of claim 23, further comprising at least one additional additive selected from the group consisting of calcium stearate, magnesium stearate, organic stearates, silicon oil, mineral oil, and mixtures thereof.

25. The laminate of any one of claim 23 or 24, wherein said laminate is adhered by an adhesive, ultrasonic bonding, thermal bonding, or combinations thereof.

26. The laminate of any one of claim 23 or 24, comprising a disposable hygiene article.

27. The laminate structure of claim 26, wherein said disposable hygiene article is selected from the group consisting of diapers, training pants, adult incontinence articles and feminine hygiene articles.

* * * * *